Jan. 6, 1953 L. N. HAYNES 2,624,380
BRUSH SAW
Filed Aug. 11, 1947 3 Sheets-Sheet 1
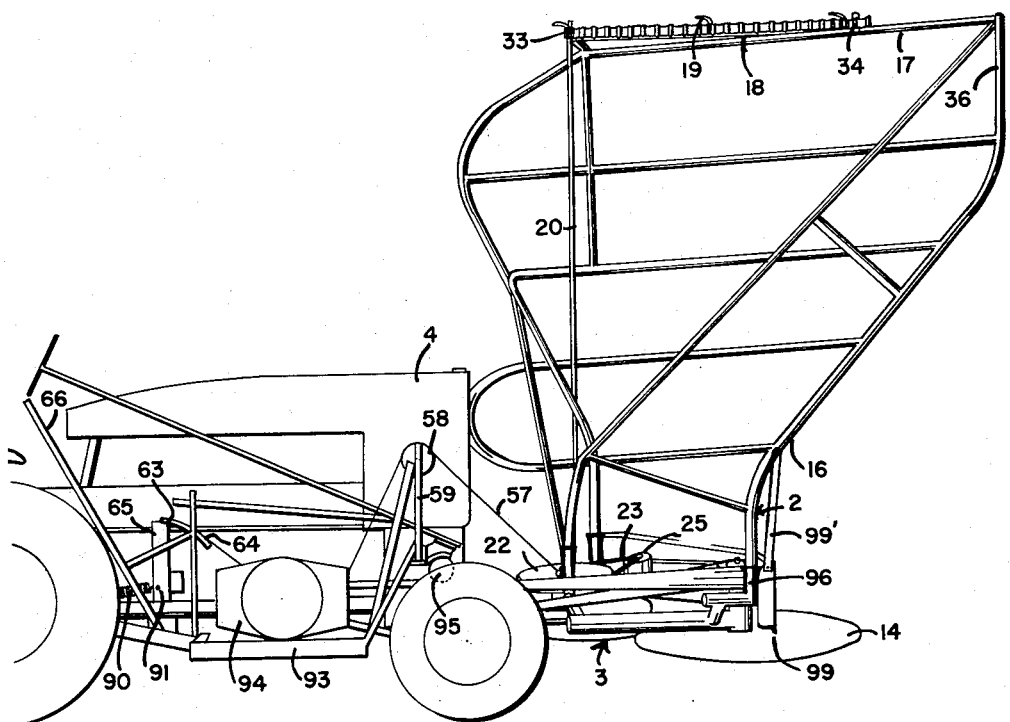
Fig. 1
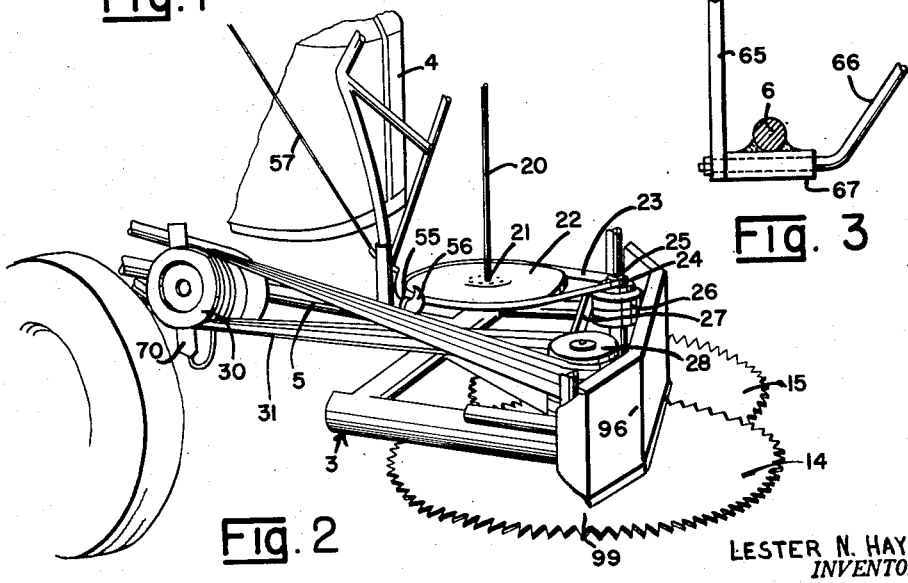
Fig. 2
Fig. 3
LESTER N. HAYNES
INVENTOR.
BY Lester B. Clark
& Ray L. Smith
ATTORNEYS Jan. 6, 1953 L. N. HAYNES 2,624,380
BRUSH SAW
Filed Aug. 11, 1947 3 Sheets-Sheet 2

LESTER N. HAYNES
INVENTOR.

BY Lester B. Clark
Ray L. Smith
ATTORNEYS

Jan. 6, 1953     L. N. HAYNES     2,624,380
BRUSH SAW
Filed Aug. 11, 1947     3 Sheets-Sheet 3
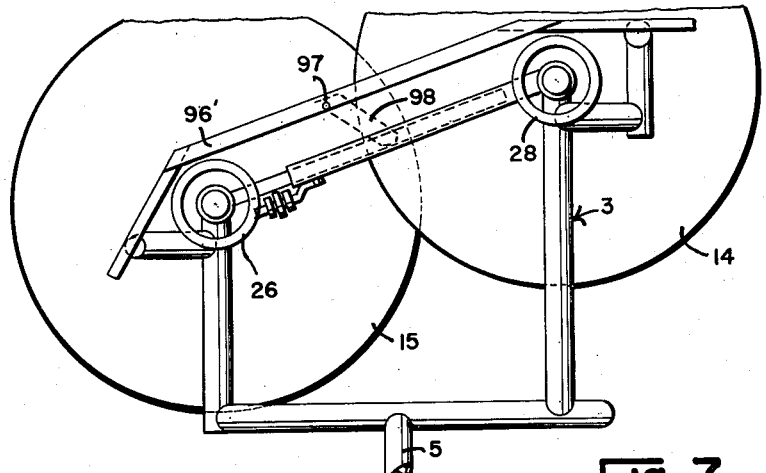
Fig. 7
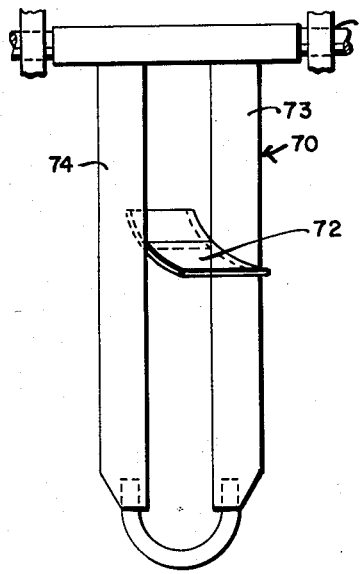
Fig. 8
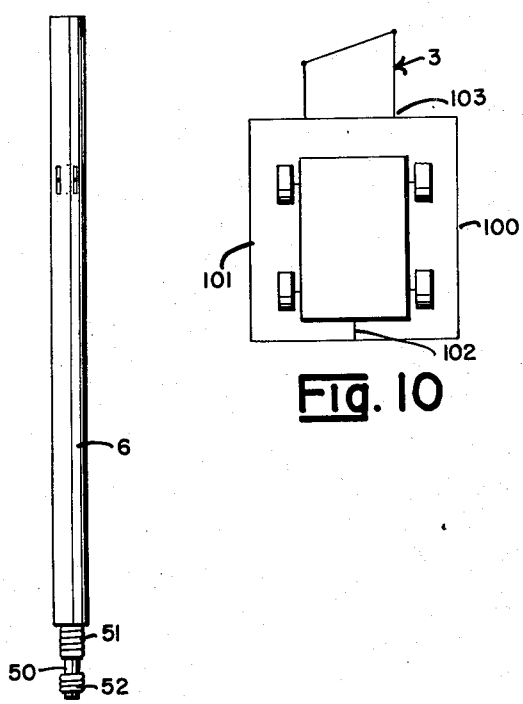
Fig. 9
Fig. 10
LESTER N. HAYNES
INVENTOR.
BY Lester B. Clark
    Ray L. Smith
ATTORNEYS Patented Jan. 6, 1953

2,624,380

UNITED STATES PATENT OFFICE 2,624,380

BRUSH SAW

Lester N. Haynes, Livingston, Tex.

Application August 11, 1947, Serial No. 768,048

6 Claims. (Cl. 143—43)

The invention relates to a portable saw assembly for clearing brush, trees, or the like from a plot of ground.

An object of the invention is to provide an improved portable saw assembly construction for clearing brush, trees, and the like, especially from areas to be used for a right-of-way, utility lines and roadways.

Another object of the invention is to provide a portable saw assembly which is so constructed that it may be readily mounted on a tractor or other portable carrier for operation.

Another object of the invention is to provide a saw assembly of improved construction arranged to be carried on a portable carrier which is provided with means for normally, resiliently retaining the assembly in substantially parallel relation with the ground over which the whole is moving.

Another object of the invention is to provide a saw assembly of improved construction arranged to be carried on a tractor or the like which is provided with means for normally, resiliently retaining the assembly in substantially parallel relation with the ground over which the whole is moving but which means is operable to tilt the saw assembly with respect to the ground.

Another object of the invention is to provide a saw assembly arranged to be carried on a portable carrier, which assembly can be raised and lowered with respect to the ground.

Another object of the invention is to provide a saw assembly arranged to be carried on a portable carrier which assembly can be raised and lowered with respect to the ground, the assembly being so constructed and arranged that the forward end thereof may tilt upwardly to raise the cutting elements of the assembly to a higher position off the ground.

A further object of the invention is to provide an assembly for carrying saws which assembly is arranged to be carried on a tractor or the like, the assembly being so mounted on the tractor that undue substantially longitudinal shock or jar against the assembly will be absorbed without damage thereto.

A still further object is to provide a device of the class described including power driven cutter elements arranged to clear a path the full width of the portable carrier.

Other objects and advantages of the invention will become more readily apparent from a consideration of the following description and drawings wherein:

Fig. 1 is a side elevational view showing an embodiment of the invention mounted on a tractor;

Fig. 2 is a perspective of a portion of the front end of the device showing an arrangement of the construction;

Fig. 3 is a detail of the construction showing the mounting of the operator's lever upon the control tube;

Fig. 4 is a perspective view showing a method of securing the rear portion of the device to a tractor or the like;

Fig. 7 is a plan view showing details in the construction of the front portion of the cutting assembly;

Fig. 8 is a detail of the guiding yoke for the control tube;

Fig. 9 is a plan view of the rearward section of the control tube;

Fig. 10 is a schematic diagram showing how the device may be mounted on a jeep or similar portable carrier.

In Fig. 1 the device is shown generally at 2 as being arranged on a tractor 4. While a tractor is shown as being the mobile means for the device it seems obvious that such device may be readily adapted to any desired vehicle or carrier. The construction as shown generally comprises a carriage 3 extending forwardly of the front of the tractor 4. The carriage includes a forward section 5 of the control tube 6 which extends rearwardly beneath the tractor, the two sections of such control tube being pivotally interconnected as indicated at 7.

Figure 4:
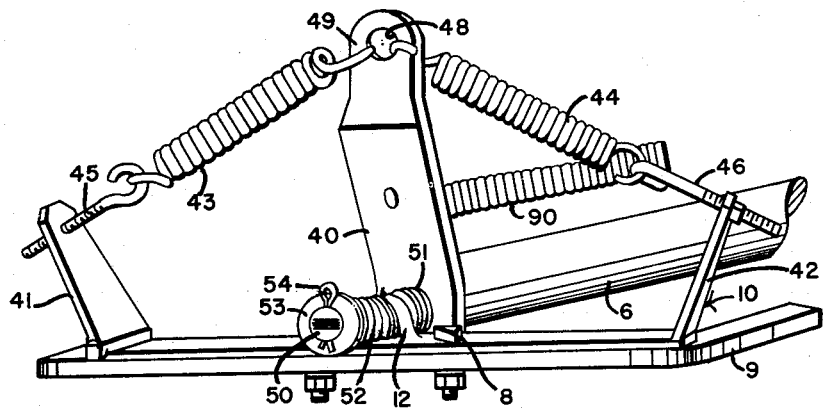

As best seen in Fig. 4 the tube 6 is secured on the rear end of the tractor by suitable means such as the bolts 8 which extend through the tractor hitch 9 and through the framework 10 in which the rear end of the control tube is journaled at 12.

Adjacent the forward end of the carriage 3, saws 14 and 15 are rotatably mounted upon the lower ends of shafts journaled in the carriage and provided with drive pulleys 26 and 28. Extending substantially vertically from the carriage 3 is a framework 16. This framework is arranged at an angle with respect to the tractor and extends upwardly a suitable distance so that it will contact trees as they are being cut. At the top 17 of the framework 16 is a chain 18 which is provided with fingers 19 arranged to engage the trees, brush, or the like being cut. A shaft 20 extends upwardly from the carriage 3 and has a sprocket 33 on its upper end to drive the chain 18. This shaft is provided at its lower end 21 with a pulley 22 which is driven by a belt 23 passing over pulley 25 at the upper end of the multiple V-belt pulley 26.

Attention is directed to Fig. 7 wherein the saws are shown as mounted on said carriage in overlapping relationship with the forward cutting edges thereof progressively positioned rearwardly from the front of said carriage toward the side and rear of the carriage.

The V-belt pulley 26 is driven by a plurality of belts 27 from the pulley cluster 29 which is in turn supplied with power from the multiple V-belt pulley 30 through belts 31. It seems apparent that, when power is supplied to the pulley 30, in the manner to be hereinafter described, the saws 14 and 15 are driven to effect desired cutting action. At the same time the pulley 22 is driven to rotate the shaft 20 and the sprockets 33 and 34 on which the chain 18 is mounted. It therefore seems obvious that as the saws are rotating to cut the brush, trees, or the like, the chain 18 with the fingers 19 will engage such severed growth and move them to the side as the tractor advances. The framework 16 has its forwardmost point at 36 and thence extends rearwardly at an angle towards the tractor and to the left side thereof, and since the blades are preferably rotating in a right hand direction it seems obvious that the cut material will tend to naturally slide along the framework to the side of the tractor adjacent the saw 15. Cooperating therewith is a dozer blade 96' which likewise contributes to move severed material sidewardly from the path of the oncoming carrier 4.

In Fig. 4 the control tube 6, which is journaled at 12 in the support structure 10 is shown as secured to an upright arm 40 which is positioned slightly forward of the journal 12. Wings 41 and 42 on the support structure 10 are interconnected with the arm 40 through springs 43 and 44 which are attached thereto by any suitable means such as the J-bolts 45 and 46 respectively. The other ends of the springs 43 and 44 are secured in the eye 48 in the upper end 49 of the upright 40. This construction normally retains the control tube 6 and the carriage 3 in a parallel relation with the ground.

The control tube 6 terminates at its rear end in the shaft portion 50 which passes through the journal bearing 12. Compression springs 51 and 52 surround such shaft portion at opposite sides of the journal and these elements are maintained in assembled relation by means of the washer 53 and the cotter pin 54 which passes through the end 50 of the shaft 60. The springs 51 and 52 are of such dimensions and strengths that they are constantly under compression and resiliently hold the control tube in a predetermined axial position relative to the journal 12 and associated elements. If shock is imparted to the carriage 3 or the saws 14 and 15 such shock will be transmitted longitudinally through the shaft 6 and will be dissipated in these springs.

Figure 5:
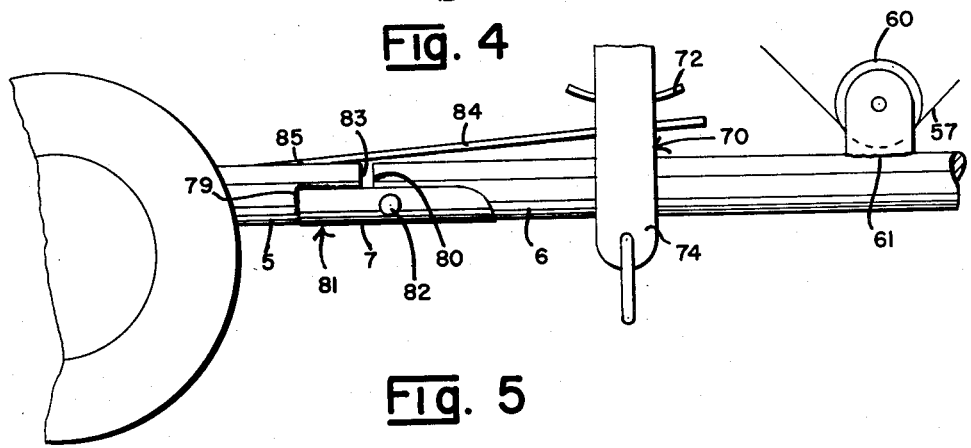
Fig. 5 is a detail of the construction which permits the forward end of the device to tilt upwardly.

Usually during the operation of the portable saw herein described the saws 14 and 15 will be positioned about one to three inches above the ground but in moving over rough terrain it may be necessary to raise the blades so as to move over the ground either during actual clearing operations or transport. To this end there is secured in the loop 55 on the carriage 3 a hook 56. Connected thereto is a cable 57 which extends upwardly over the pulley 58 on the vertical arranged bar 59 and thence downwardly under the pulley 60 mounted on the tube 6 at 61 as shown in Fig. 5. The cable 57 then extends upwardly and is connected at 63 to the arcuate arm 64. This arcuate arm is connected to an upstanding bar 65 which is rigidly attached to the lever 66 of which the lower end passes through the journal sleeve 67 secured to and extending transversely of the control tube 6, as best seen in Fig. 3.

Adjacent the forward end 4 of the tractor is a yoke 70 swingably mounted as at 71 on the tractor frame. The yoke 70 is arranged to receive the control tube 6 and is provided with a plate 72 fixed between the arms 73 and 74 of the yoke 70, as best seen in Fig. 8.

In Fig. 5 the yoke is shown in position with the control tube 6 passing therethrough. At the end 80 of the tube section 5 and about a portion of the outer periphery thereof is a saddle 81 secured to the tube by weld metal 79. This saddle 81 is pivotally connected to the tube 6 by the pin 82 extending through the saddle and the tube.

Figure 6:
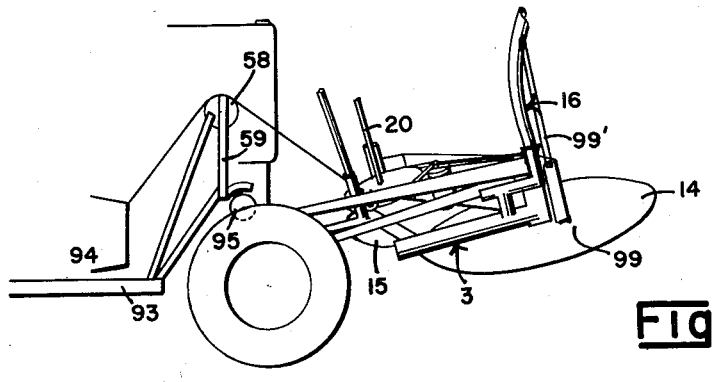
Fig. 6 is a perspective view illustrating the position of the cutting assembly when in tilted position.

Adjacent the end 83 of the tube section 5 and secured thereto is an arm 84 which extends upwardly and rearwardly into the yoke 70 when the saw assembly is lifted by rearward movement of the lever 66 and arm 65, the entire saw assembly including the control tube 6 is lifted until the arm 84 engages the plate 72. Further movement of the lever 66 causes the carriage 3 to swing upwardly on the pivot 82 whereby the entire carriage with the saws 14 and 15 are lifted to a desired elevated position as clearly shown in Fig. 6.

As is apparent from Fig. 3 sideward movement of the control tube 66 is capable of producing rotational movement of the control tube 6 and in this manner tilting of the carriage 3 is effected. Such tilting increases the tension either in spring 43 or 44 and hence the resulting unbalanced tension in the springs tends to return the carriage 3 to a position of parallel alignment with the ground.

It seems apparent from the foregoing that by constant control of the lever 66 by the operator both the vertical position of the carriage 3 and associated elements and tilting thereof may be controlled.

A tension spring 90 is attached at its opposite ends to the upright 40 and the arm 65 respectively. In this manner a portion of the weight of the device is spring supported and the operator may easily regulate the elevation of the device through manipulation of the lever 66.

While it is believed that the operation of the invention is apparent from the foregoing, by way of summary and to more clearly illustrate the invention it will be assumed that the invention is to be mounted on a tractor as shown in the accompanying drawings.

In order to position the assembly on a tractor, or the like, it is only necessary that the tractor be run forward over control tube 6 until the rearward end thereof is near the hitch 9. The support structure 10 is then lifted to position upon the hitch and is secured in place by means of the bolts 8. Vertical support 59 and the motor support 93 with motor 94 thereon may be secured on the tractor. The forward end of the assembly may be mounted on the framework of the tractor as illustrated at 95. A similar and suitable rearward support for the motor assembly (not shown) is likewise provided.

The yoke 70 is swingably mounted on the tractor and then the framework 16 is positioned on the carriage 3. Such framework may be secured by any suitable means on the carriage 3 and is shown as fitting into sleeves 96 which extend upwardly from the carriage.

Drive belts are then applied between the motor 94 and the V-belt pulley 30, it being assumed that the belts forwardly thereof were previously applied. The operator may then start the tractor which furnished motivation for the whole assembly. The motor 94 which supplies energy to the pulley cluster 30 may then be started and the whole is ready for operation. As the blades 14 and 15 rotate to cut the brush and trees or the like they will tend to slide off the framework, and if the brush or trees are high enough they will be engaged by the fingers 19 on the chain 18 so as to urge them to the side as the tractor advances. If for any reason it is desired that the saw blades 14 and 15 be moved vertically it is only necessary that the operator move the lever 66 rearwardly. When this is done the shafts 5 and 6 move upwardly until the arm 84 contacts the blade 72. If the operator desires that the saw assembly be lifted further he may effect further movement of the lever 66 which causes the arm 84 to pivot downwardly against the rod 6 whereby the shaft 5 and carriage 3 are pivoted upwardly.

If for any reason the operator desires that the horizontal angle with respect to the ground be changed such movement may be effected by moving the lever 66 sidewise with respect to the tractor whereby either of the springs 43 or 44 are put under tension as previously described. Movement of the lever 66 to initial position will of course return the device to normal position.

Fig. 7 is a top plan view showing the carriage 3 and a construction thereof. It is to be noted that the dozer blade 96' is mounted immediately forward of the pulley clusters 26 and 28 and extends high enough so that cut brush will not be entangled in the pulley belts. To assist in maintaining the saws and overlying elements of the device clear of severed growth, the lower edge of the dozer bar 96' has a knife edge 99. Similarly, to assist in parting of the severed growth, there is provided an upstanding blade 99' at the forward and lower end of the frame 16. This blade is secured at its opposite ends to the frame 16 and the dozer bar 96', respectively.

Connected to the dozer blade at 97 (Fig. 7) is a guard arm 98 which extends between the blades 14 and 15 so as to prevent contact therebetween during rotation.

Fig. 9 is a top plan view showing the shaft 6 with the springs 51 and 52 on the portion 50 thereof.

Fig. 10 illustrates a construction wherein the device of the invention is for use on a portable carrier such as a jeep. As shown in this figure the control tube 6 is replaced by arms 100 and 101 which are connected at 102 to the rear end of the vehicle and extend forwardly and are connected at 103 to a carriage 3.

Broadly, the invention contemplates a saw assembly for clearing brush and trees or the like from a plot or strip of ground.

What is claimed is:

1. A brush saw adapted to be detachably mounted on a portable carrier comprising, a carriage, a control tube having front and rear sections longitudinally aligned on the nether side of the carrier and pivotally secured together, a yoke through which said tube extends, a plate mounted therein above said control tube, an arm mounted on said front section and extending upwardly and rearwardly through said yoke and between said plate and the rear section of said control tube, said carriage being secured to the forward end of the front section, horizontally disposed rotatably mounted saws thereon, a second frame vertically arranged adjacent said saws, means to rotate said saws, and means to raise said sections to a predetermined point which is the contact point between said arm and plate whereby continued movement of said raising means engages said arm against said rear section to thereafter pivot the front section and carriage upwardly.

2. A brush saw adapted to be detachably carried on a portable carrier comprising, a carriage, a control tube attached thereto and extending rearwardly thereof, horizontally disposed rotatably mounted saws on the carriage, a frame extending upwardly from the carriage adjacent said saws, means to rotate said saws and means to raise and lower said control tube and means connected to said tube to rotate it about its axis whereby the carriage is maintained at a predetermined elevation and angular position relative to the terrain over which the carrier passes.

3. A brush saw adapted to be detachably carried on a portable carrier comprising a carriage, a control tube attached thereto and extending rearwardly thereof, horizontally disposed rotatably mounted saws on the carriage, a frame extending upwardly from the carriage adjacent said saws, means to rotate said saws, means to raise and lower said control tube and means connected to said tube to rotate it about its axis whereby the carriage is maintained at a predetermined elevation and angular position relative to the terrain over which the carrier passes, and means operable to engage and move the severed growth to the side as the carrier advances.

4. A brush saw adapted to be carried on a portable carrier comprising a carriage, saws rotatably mounted in overlapping relationship on said carriage with the forward cutting edges of said saws positioned progressively rearwardly from the front of said carriage toward the side and rear thereof, resilient means acting in the direction of the thrust on said saws to balance said saws in fore and aft position and to cushion the impact of said saws with the brush, said resilient means mounted rearwardly of the cutting plane of said saws, and additional means to rotate said saws.

5. A brush saw adapted to be carried on a portable carrier comprising a carriage, a substantially vertical brush engaging frame extending upwardly from said carriage adjacent said saws to guide the brush sidewardly of said carriage, saws rotatably mounted in overlapping relationship on said carriage with the forward cutting edges of said saws progressively positioned rearwardly from the front of said carriage toward the side and rear thereof, and resilient means acting in the direction of the thrust on said saws to balance said saws in fore and aft position and to cushion the impact of said saws with the brush, said resilient means mounted rearwardly of the cutting plane of said saws.

6. In a device adapted to be removably secured to a portable carrier to sever growth in situ, a carriage, saws mounted in overlapping relationship thereon with the forward cutting edges of said saws positioned progressively rearwardly from the front of said carriage toward the side and rear thereof, a resilient mounting to balance said carriage in a fore and aft position and to absorb shock in a fore and aft direction, said mounting including an abutment means on said carrier, and an abutment on said carriage, spring means on said carriage positioned fore and aft adjacent said abutment means on said carrier to absorb shock in a fore and aft direction.

LESTER N. HAYNES.

REFERENCES CITED

The following references are of record in the file of this patent:

UNITED STATES PATENTS

| Number | Name | Date |
|---|---|---|
| 832,273 | Perron | Oct. 2, 1906 |
| 1,414,319 | Zaiauskis | Apr. 25, 1922 |
| 1,456,740 | Link | May 29, 1923 |
| 1,602,357 | Georgelis | Oct. 5, 1926 |
| 1,645,924 | Palmigiano | Oct. 18, 1927 |
| 1,710,749 | Svendsgaard | Apr. 30, 1929 |
| 1,830,871 | Domagala | Nov. 10, 1931 |
| 2,158,541 | Horstmann | May 16, 1939 |
| 2,216,971 | Farmer | Oct. 8, 1940 |
| 2,295,458 | Edwards | Sept. 8, 1942 |
| 2,312,287 | Renner | Feb. 23, 1943 |
| 2,411,623 | Jacques | Nov. 26, 1946 |
| 2,426,694 | King | Sept. 2, 1947 |
| 2,462,314 | Fuqua | Feb. 22, 1949 |
| 2,463,232 | Zimicki | Mar. 1, 1949 |
| 2,489,204 | Sprick et al. | Nov. 22, 1949 |